United States Patent [19]
Orth et al.

[11] 4,133,274
[45] Jan. 9, 1979

[54] METHOD OF REGENERATING LAWN SURFACES

[75] Inventors: Günther Orth, Birken; Rudolf Pietsch, Betzdorf, Sieg; Ewald Grundler, Steinach üb., all of Fed. Rep. of Germany

[73] Assignee: Wolf-Gerate GmbH, Betzdorf, Sieg, Fed. Rep. of Germany

[21] Appl. No.: 773,125

[22] Filed: Feb. 28, 1977

[30] Foreign Application Priority Data
Feb. 27, 1976 [DE] Fed. Rep. of Germany ....... 2608074

[51] Int. Cl.² .............................................. A01C 11/00
[52] U.S. Cl. ........................................... 111/2; 47/73; 47/74; 172/22; 111/DIG. 1
[58] Field of Search ...................... 47/73, 74; 111/8, 2, 111/3, 4, DIG. 1; 172/22

[56] References Cited
U.S. PATENT DOCUMENTS

| | | | |
|---|---|---|---|
| 3,025,636 | 3/1962 | Warren | 47/73 |
| 3,154,884 | 11/1964 | Amar et al. | 47/74 X |
| 3,210,112 | 10/1965 | Glynn | 172/22 X |
| 3,589,319 | 6/1971 | Peters | 111/2 |
| 3,817,337 | 6/1974 | Panak et al. | 172/22 X |

*Primary Examiner*—E.H. Eickholt
*Attorney, Agent, or Firm*—Mason, Fenwick & Lawrence

[57] ABSTRACT

A wheel supported chassis has a motor driving it intermittently across a lawn or turf surface for predetermined distances between cycles, a rotary drilling means drills holes in the turf area while the apparatus is stationary, a collecting platform feeds tubular plugs from an upper elevation to a transport wheel which positions a plug carried in a tubular container over a drilled hole, a cylinder for reciprocating the drilling means also effects pushing of the plug into the drilled hole with the plug being removed from a tubular container and the cycle being repeated as the apparatus traverses a desired work area.

3 Claims, 33 Drawing Figures

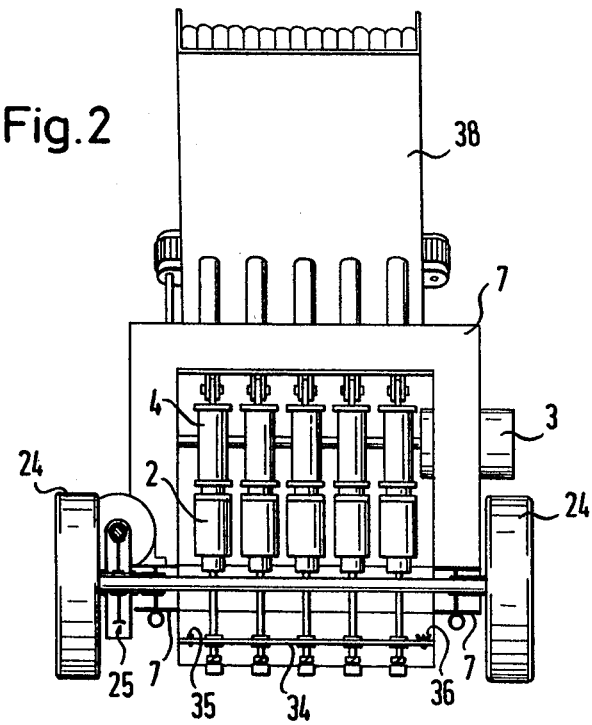
Fig.2
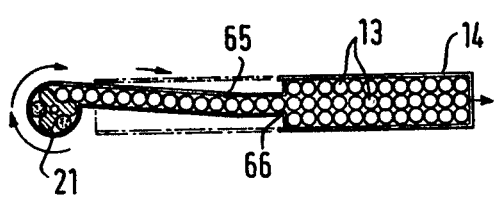
Fig.3
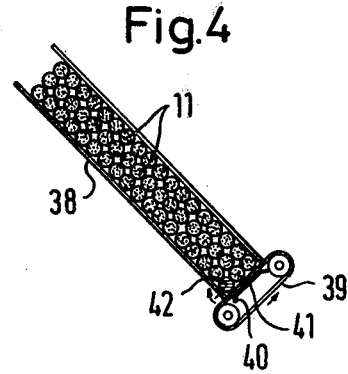
Fig.4
Fig.5

180°

90°

60°

120°/60°

METHOD OF REGENERATING LAWN SURFACES

The invention relates to a method for repairing and improving damaged lawn surfaces, in particular of grass sport pitches.

The problem underlying the invention is to return such damaged lawn surfaces of sport pitches in the shortest possible time so as to completely close the damaged surfaces so that only relatively brief interruptions of play are necessary.

According to the invention this problem is solved in that in the region of the damaged grass surfaces strong tread-resistant intensive-stock and correspondingly regeneratable cultivated lawn grasses are introduced into the damaged surface in punctiform directed manner at predetermined intervals in predrilled plant holes.

It has been found that with this method within 4 to 6 weeks the damaged surface can be returned to a completely closed state and simultaneously the resistance of the damaged surface to mechanical stressing is considerably improved. By the punctiform directed sowing or planting of special types of lawn grasses the hardwearing properties are improved compared with the original properties and thus the resistance of the pitch and possible playing frequency substantially enhanced.

The invention also relates to an apparatus for carrying out the method. According to a first embodiment of the invention for the regeneration of small surfaces for manual operation an earth borer slidable in a guide tube is provided which during the drilling operation is supported by means of a bottom plate connected to the guide tube, and for more convenient manipulatiion an extension tube may be provided into the upper end of which a drilling machine may be inserted and which guides a drilling spindle extension. To facilitate the return operation return springs may be provided for the earth borer. The plant tubes may be introduced directly into the hole thus predrilled by means of a piston-like tool. The holes may conveniently be arranged with such manual operation at predetermined mutual intervals using hole templates.

To work larger surfaces, according to a further development of the invention a travelling apparatus is provided which is characterized in that on a chassis with interval drive in one or multi-row working array drilling or punching tools bore or punch holes in the lawn support layer by a mechanical pressure means to which via an automatic feed means plant tubes with pregrown individual plants are led and the individual plants pushed by means of a pressure ram through the plant tubes into the plant holes.

According to the invention, in the apparatus further means are provided which fill the drilled holes selectively with plants and/or soil-improving materials. The invention is accordingly based on the knowledge that the module-like construction of the planting machine permits the extended use thereof as aerification machine. In this manner, in the predrilled holes sand, turf and fertilizer mixtures may be introduced. The introduction can be via small tubes as in the apparatus for inserting plants. All that is necessary is to replace the tubes filled with plants by tubes with other fillings, the operation remains the same.

A simpler and more economical operation is however achieved if the holes thus predrilled are filled with bulk material, and the material can be pressed from a box and proportioning chambers into the holes.

Further developments of the planting machine constructed according to the invention and of the aerification and filling machine can be seen in the subsidiary claims. Hereinafter samples of embodiment of the invention will be described with the aid of the drawings, wherein:

FIG. 2 is a front view of the machine according to FIG. 1;

FIG. 3 is a plan view of the magazine for the empty filling tubes showing the magazine in phantom outline in its empty position and in solid outline in its full position;

FIG. 4 is a plan view of the magazine of the full tubes;

FIG. 5 is a side view of a filling tube;

Figure 1:
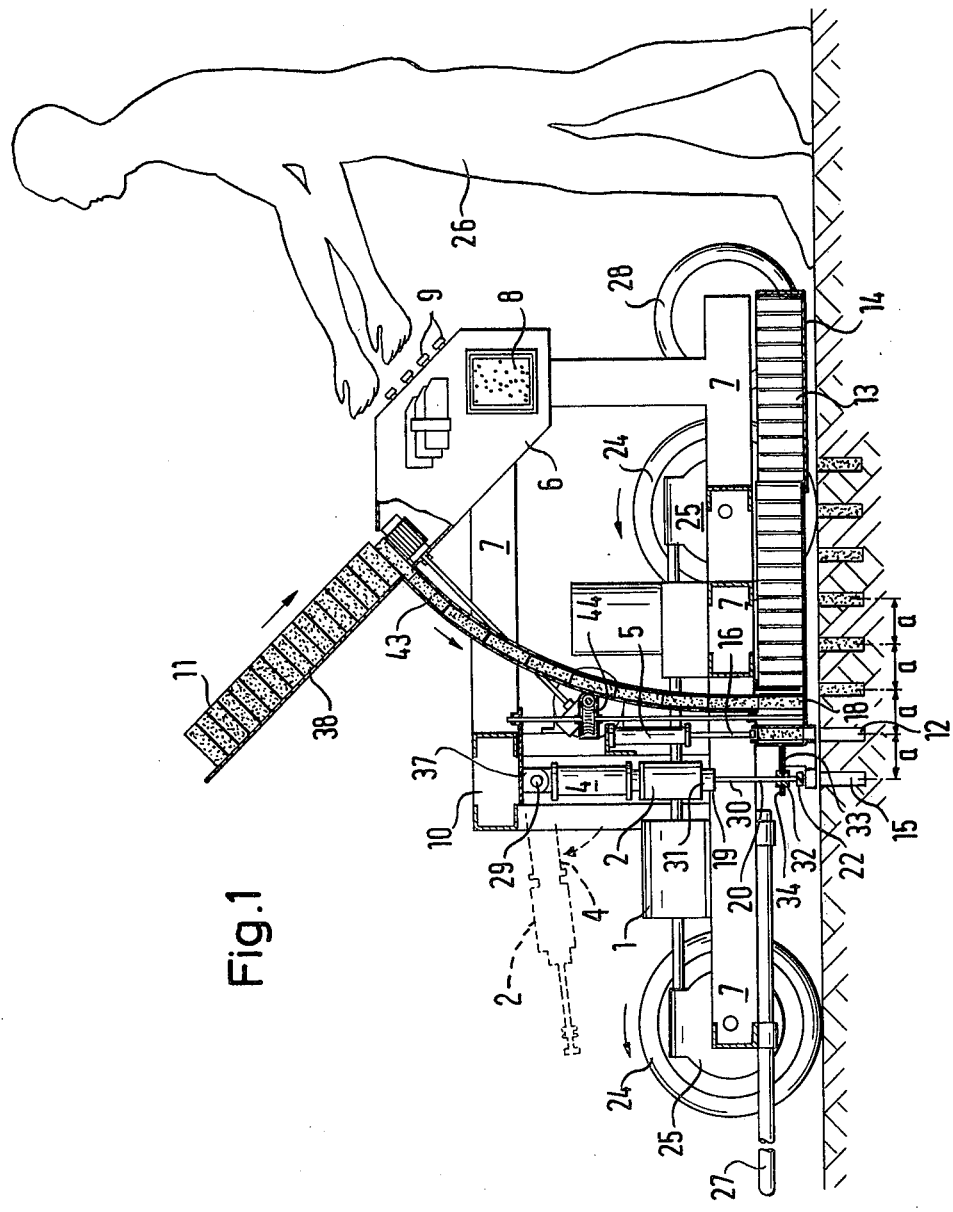
FIG. 1 is a side elevational view of a planting and filling machine comprising the preferred embodiment for practice of this invention with parts removed for clarity of illustration and illustrating motor and piston drive means pivoted to a dashed outline inoperative position assumed during movement of the machine from one location to another.
Figure 6:
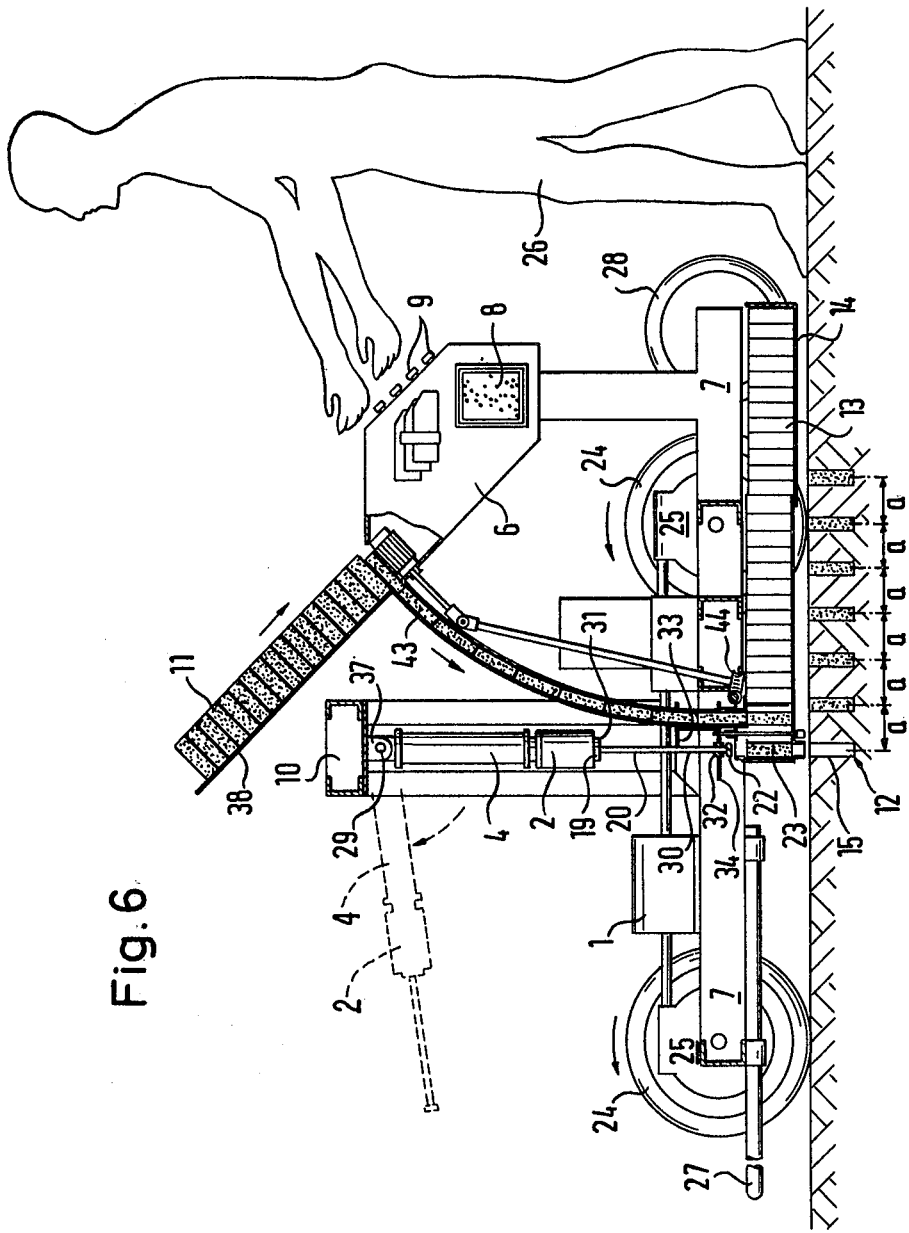
FIG. 6 is a side elevational view similar to FIG. 1 of a modified embodiment for practice of the invention with parts removed for the sake of clarity and illustrating a motor and piston drive assembly in a dashed outline in an inoperative position assumed during movement of the device from one work location to another.
Figure 23:
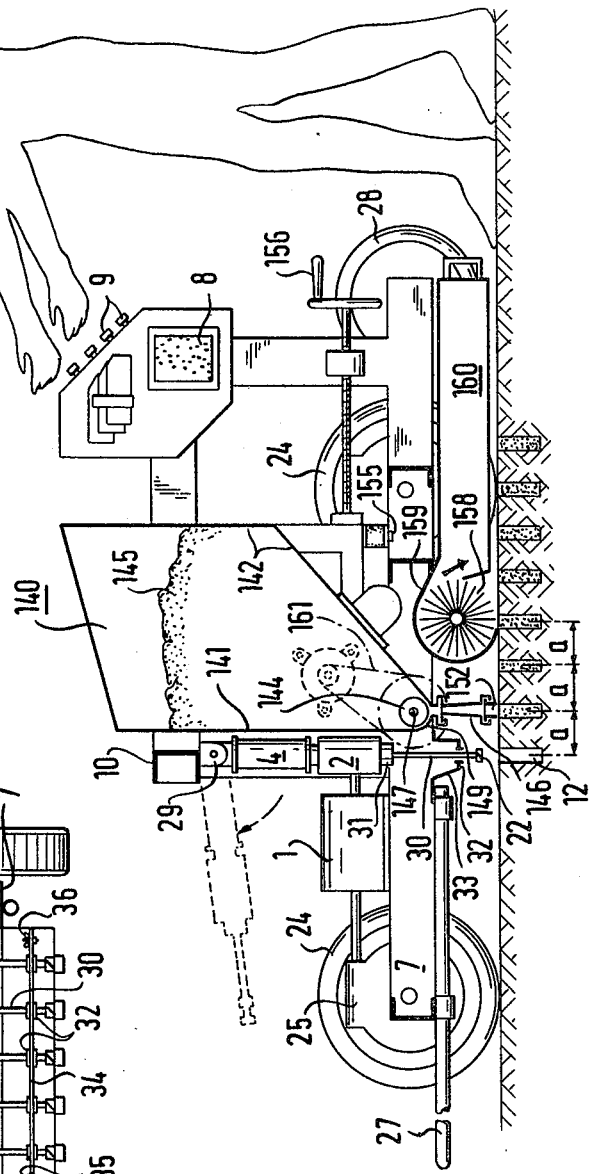
Figure 25:
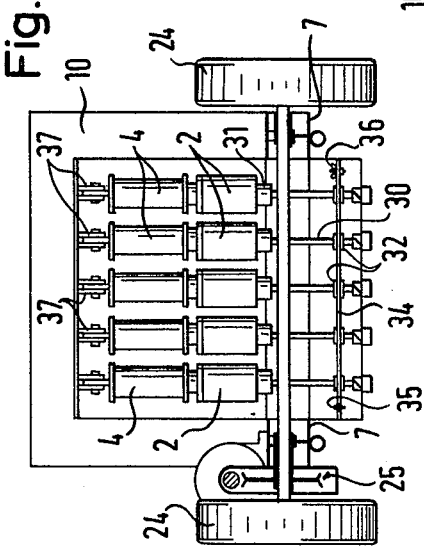
Figure 24:
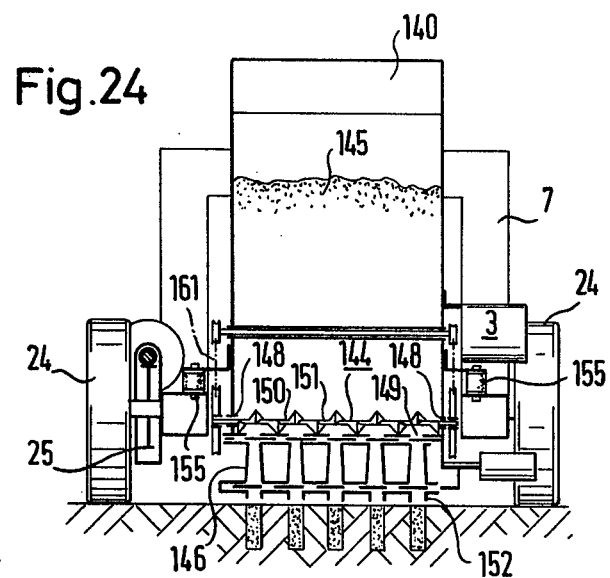

FIGS. 19–22 schematically show means for achieving different interval possibilities of the machine according to FIG. 1;

FIG. 23 is a side view corresponding to FIGS. 1 and 6 of a further embodiment of the apparatus;

FIG. 24 is a front elevational view of the apparatus of FIG. 23 with portions sectionally removed to illustrate internal components;

FIG. 25 is a front elevational view of the embodiment of FIG. 23 with portions sectionally removed for purposes of clarity.

Figure 26:
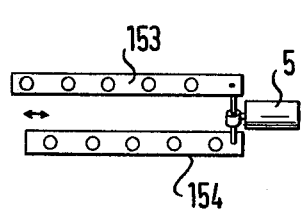
Figure 27:
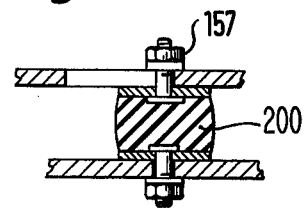

FIG. 26 is a detail view of the control valve of the proportioning chambers;

FIG. 27 is a partial view of the vibration damper construction.

Figure 29:
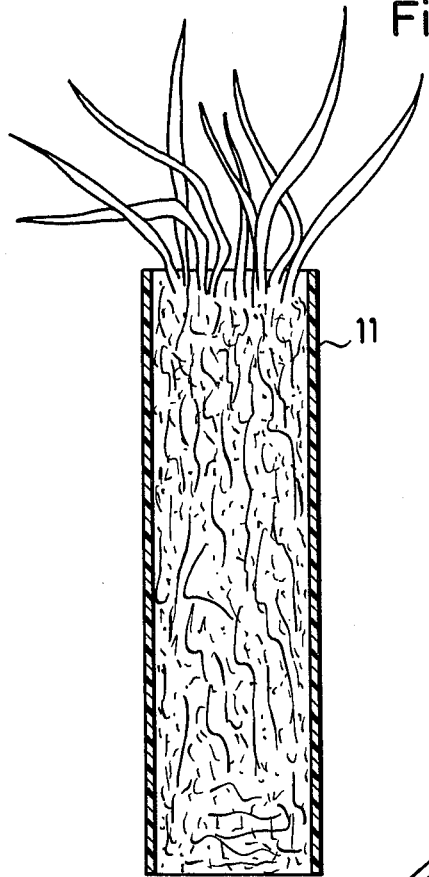
Figure 28:
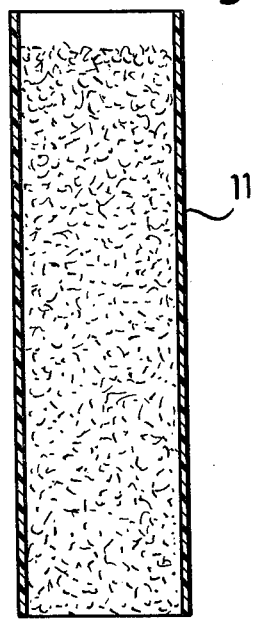

FIG. 28 is a sectional view of a detail of a plant tube with soil substrate;

FIG. 29 is a bisecting sectional view of a plant tube including pre-grown individual plants.

Figure 30:
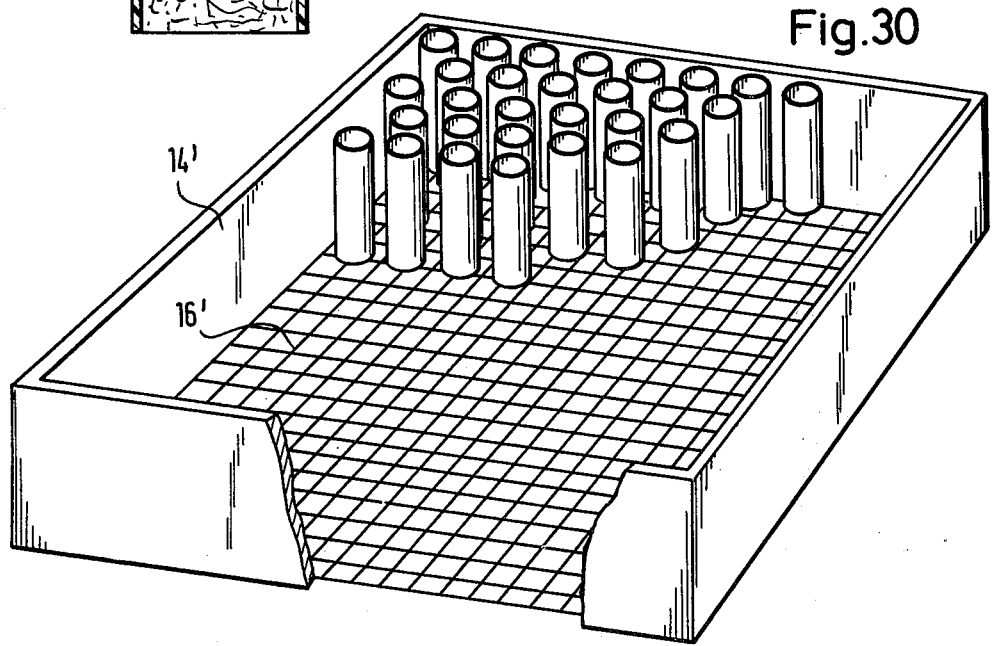
Figure 31:
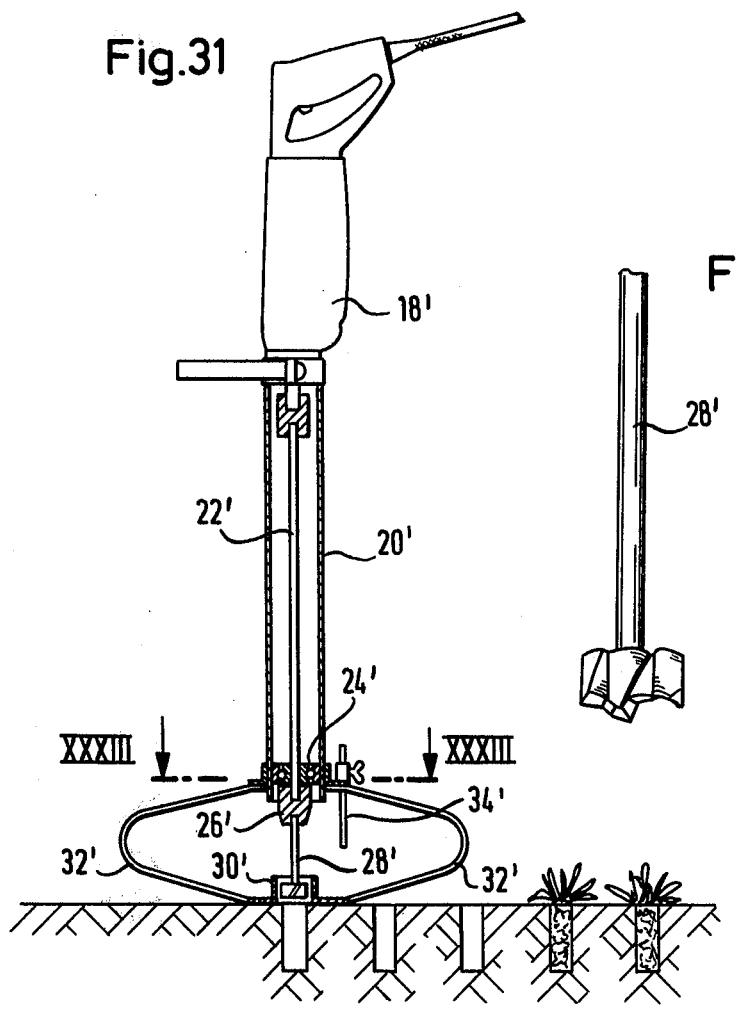
Figure 32:
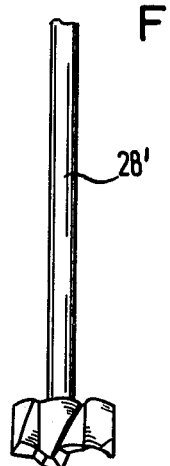
Figure 33:
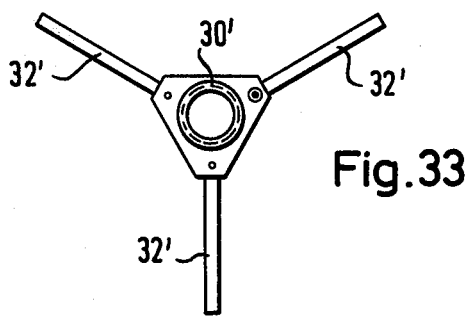

FIG. 30 is a schematic view of a plant box having a side wall broken away for illustration of the interior construction according to the invention;

FIG. 31 is a schematic view of a drilling device suitable for semi-manaul operation;

FIG. 32 is a view of the special earth borer used in the apparatus according to FIG. 31;

FIG. 33 is a sectional view taken along lines XXXIII—XXXIII of FIG. 31.

FIG. 1 shows a first embodiment of a fully automatically operating planting machine. To obtain fully automatic operation adjusting motors are provided for carrying out the necessary movement cycles. The motor 1 effects the intermittent advance of the machine intermittently operated clutch drive means to wheels supporting the machine on the work surface. The motor 2 turns the drilling spindle. The gear motor 3 serves as drive for the conveying means. A piston drive 4 effects an axial displacement of the drilling spindle. A further piston drive 5 effects in the apparatus according to FIG. 1 the ejection of the plants into the predrilled holes. For the rotary drive servomotors or stepping motors can be used whilst the reciprocal movements are performed with pneumatic or hydraulic piston drives or linear motors.

The apparatus comprises a control panel 6 on a machine frame 7. The control panel is programmable by means of a corresponding coding device 8. Each working step can however also be called up manually via hand switches 9.

The machine frame 7 has thereover a support bracket 10 which carries the drill units. The machine brings the filled plant tubes 11 up to the planting station 12 and the emptied tubes 13 are automatically conveyed into an empties magazine 14 which is initially in the phantom outline position of FIGS. 3 and 8 when empty but which is progressively moved to the right to the solid line position of the same figures as they achieve a filled condition.

Figure 8:
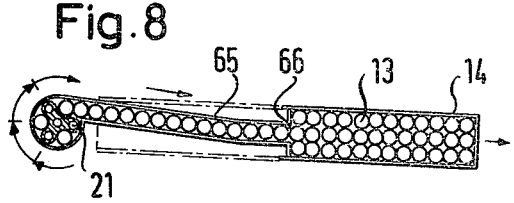
FIG. 8 is a view of the empties magazine corresponding to FIG. 3 showing the magazine in phantom outline in its empty position and in solid outline in its full position.
Figure 9:
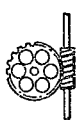
FIG. 9 is a detail of the transmissiion mechanism.

The planting machine according to the example of embodiment of FIGS. 1 and 2 corresponds to the planting machine according to FIG. 8. In this case, a hole 15 is first drilled by means of a drill and after the drilling the machine is advanced by the distance a. This interval corresponds to the axis spacing between the drilling unit and the ejection unit. The ram 16 of the ejecting unit presses the plant 18 into the predrilled hole.

Figure 7:
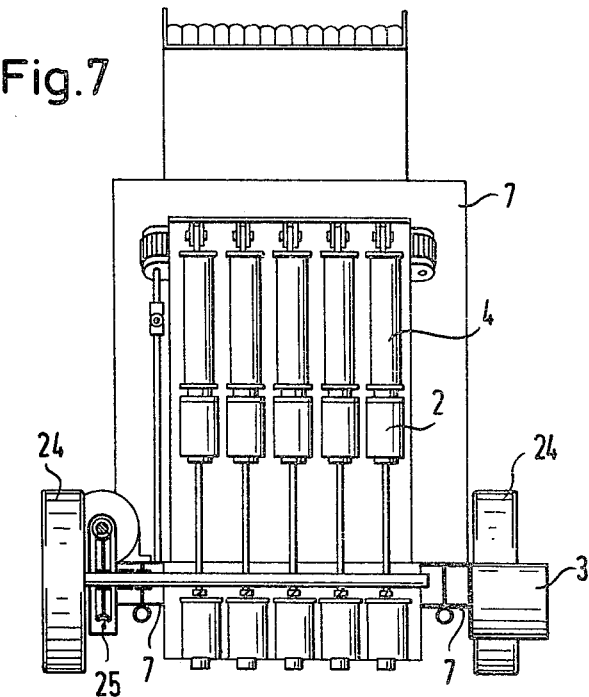
FIG. 7 is a front view of the apparatus according to FIG. 6.

In the example of embodiment according to FIGS. 6 and 7 the drilling and ejection is carried out with the same unit. After the drilling the spindle 19 is stopped and the drill 20 run out via the interval transport wheel 21 so that the drilling head in the same axis above the hole 12 can press down the plant 23 supplied. In contrast to the machine according to FIGS. 1 and 2 this apparatus according to FIGS. 6 and 7 does not require a preprogramme and both forward and rearward operation are possible.

As travelling gear, in all examples of embodiment four wheels 24 are mounted in the machine frame 7 and are driven intermittently by indexing drive means including an indexing drive or advancing motor 1. For torque transfer from the motor 1 to the wheels 24 according to the example of embodiment a worm gear 25 as shown in FIG. 1. Additionally, a clutch means, which is not illustrated, is provided for driving the worm gear in a well-known manner.

In operation the motor 1 operates as stepping motor and advances stepwise by the distance a which in the example of embodiment according to FIGS. 1 and 2 corresponds exactly to the axis spacing between the drill 20 and ram 16. In the machine according to FIGS. 6 and 7 a is an adjustable variable.

The control commands to the different drive motors may be fed in by the operator 6 manually via the switches 9 or via a control programme 8.

To bring the machine into the working position a forwardly projecting guide bar 27 is lifted until a manoeuvring wheel 28 mounted rearwardly in the machine frame carries the entire weight of the machine and the wheels 24 are relieved. The machine can now be turned and manoeuvred.

It is apparent from FIGS. 2 and 7, that the apparatus comprises five working units adjacent each other so that in each case five rows of holes can be charged automatically. To permit simpler displacement of the machine perpendicularly to the planting direction through one working width an additional travelling gear may be provided comprising four simultaneously driven wheels offset by 90° for natural movement (not illustrated in the drawings). Alternatively, the wheels may be steerable. The motor 2 of the drilling machine is connected to the extendable piston of the piston drive 4 which is suspended on the support bracket 10 via a pivot pin 29. This pivot mounting facilitates the pivoting of the unit to the dotted line position of FIG. 6 to permit the replacement and maintenance of the drills 20. The drills 20 comprise a drill head 22 and a drill shank 30 which may be clamped into a drill chuck 31. Near the drill head the shank is mounted in a guide bush 32 which is mounted in a bottom beam 33 of the machine frame 7 and secured by means of clips 34 in the axial and radial direction. The clip 34 is mounted by a securing pin 35 and secured by a rapid fastener 36. The radial and axial forces which occur in the drilling operation are transmitted via the pivot pin 29 and the claws 37 carrying it to the support bracket.

The conducting of the plant tubes 11 from a collecting platform 38 to the planting station 12 and then to the empties magazine 14 is by means of a transport system which will be described in detail hereinafter.

The magazine boxes equipped with filled plant tubes 11 are placed on the collecting platform and discharged, corresponding to the empties magazine box 14. The cover of the box which is fixedly connected to one side wall is removed upwardly. The plant tubes slip vertically to the platform 38 against a conveyor belt 39 disposed at the lower discharge end which is stabilized by a rearwardly attached support board 40. The moving endless conveyor belt 39 presses the plant tubes 41 against a run-on roller 42 disposed laterally at the discharge end. From here, the tube passes to the entry end of a downwardly leading feed hose 43. Run-on rollers 42 and feed hoses 43 are provided in identical number at the discharge end of the collecting platform 38 to the drill spindles and interval transport wheels 21. By the movement of the conveyor belt 39 and the separating effect of the run-on rollers a bridge formation of the plant tubes is prevented. Through the feed hose 43 the plant tube 11, 41 pass under the action of gravity into the interval transport wheel 21 which is driven by the motor 3 via a worm gear 44.

The mode of operation of the interval transport wheel 21 will be described hereinafter in conjunction with FIGS. 12 to 22. The purpose of said transport wheel 21 is to convey the plant tube delivered via the feed hose 43 by rotation into the transport channel.

Figure 11:
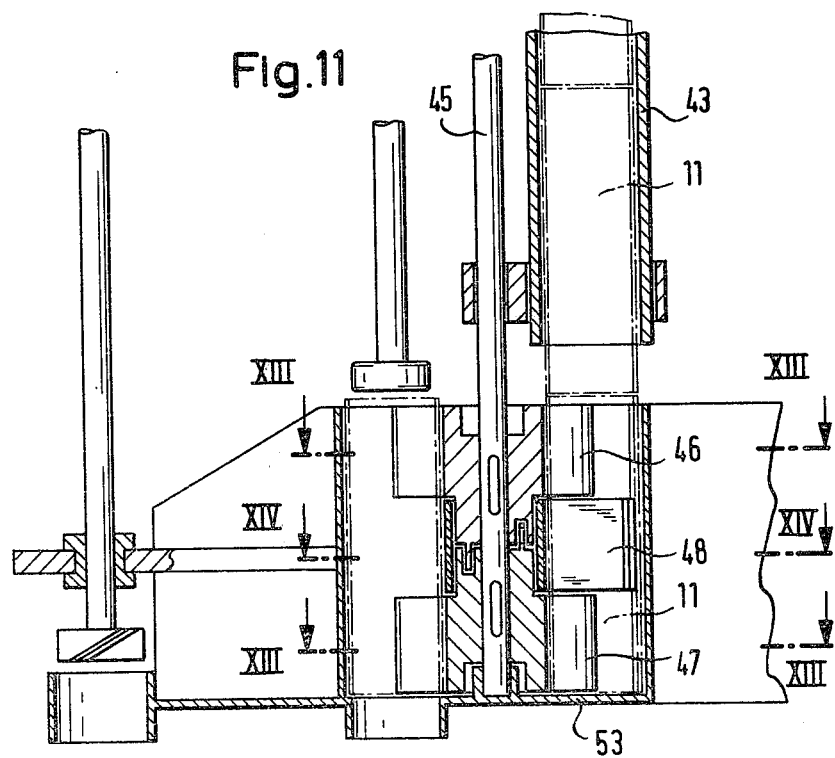
FIG. 11 is an enlarged view of the drilling and injection unit of the embodiment of FIG. 1 taken in a vertical bisecting section through the drilling and injection unit.

In the machine according to FIGS. 1 and 2 the transport wheel comprises a drive shaft 45 (FIG. 11) and the transport wheel consists of an upper disc 46 and a lower disc 47 between which a deflection tongue 48 is disposed. The functional form of the transport discs corresponds to the illustrations of FIGS. 19 to 22. In the entrance position 49 (FIGS. 13 and 14) a plant tube 11 projects slightly beyond the upper edge of the transport disc 46. On rotating the discs 46, 47 the next successive tube follows up. Via the transport discs the plant tube is rotated into the planting postion 50. As apparent from FIG. 13 the transport discs 46, 47 may comprise individual guide rollers 51 which are carried rotatably by upper and lower metal retaining plates 52. This roller arrangement greatly reduces the friction within the interval wheel housing 53. An arresting spring 54 (FIG. 14) locates the tube to be planted exactly above the planting location 50 so that the ram 16 can press the plant into the predrilled hole. On the next interval step the empty plant tube is inserted along the deflection tongue 48 into the transport channel 65.

Figure 10:
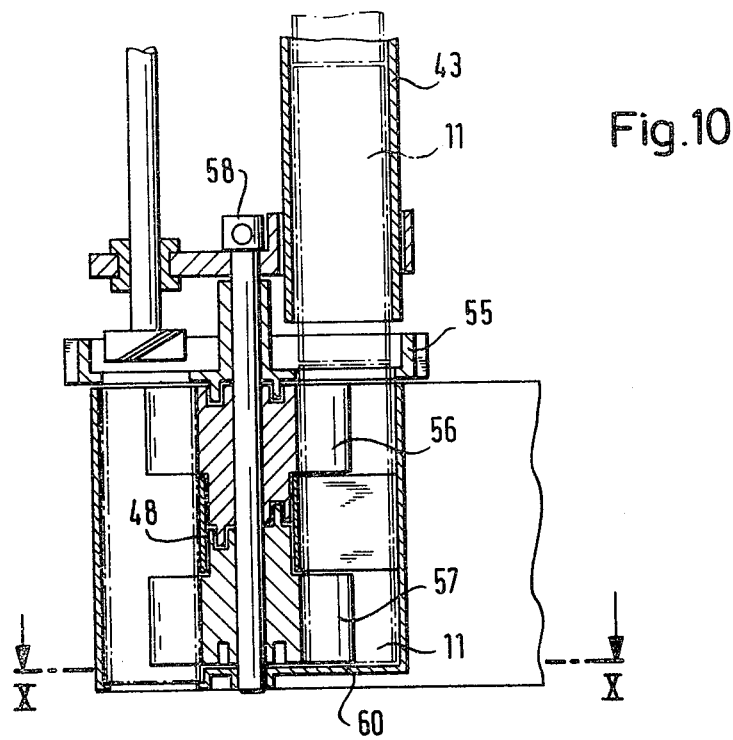
FIG. 10 is an enlarged view of the drilling and injection unit of the embodiment of FIG. 6 comprising a sectional view thereof taken in a vertical plane.
Figure 12:
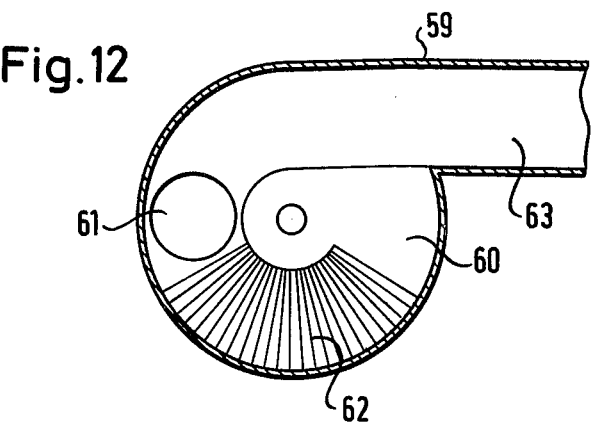
FIG. 12 is a sectional view taken along line X—X of FIG. 10.
Figure 13:
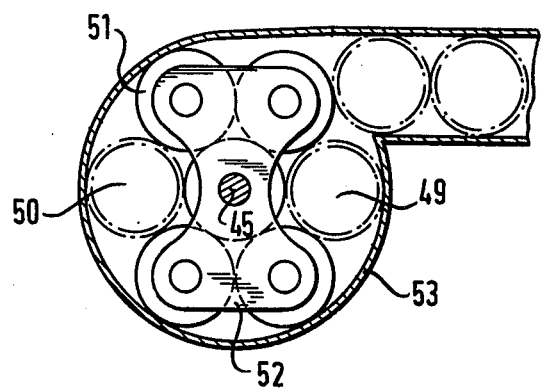
FIG. 13 is a sectional view taken along line XIII—XIII of FIG. 11.
Figure 14:
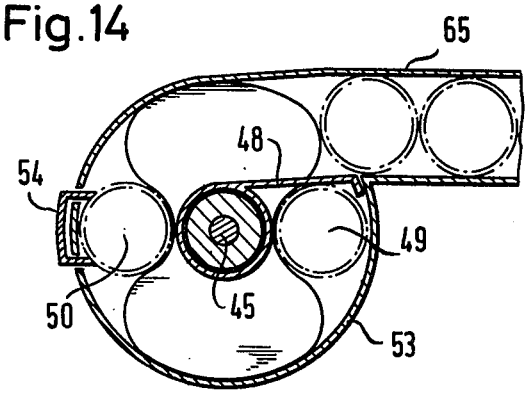
FIG. 14 is a sectional view taken along line XIV—XIV of FIG. 11.
Figure 15:
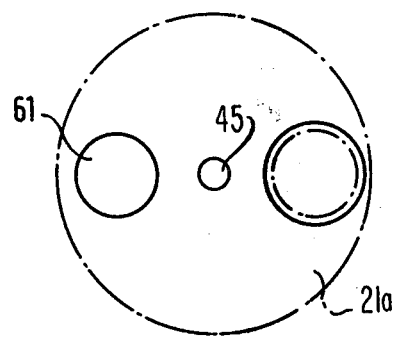
FIGS. 15 to 18 show different interval possibilities of the machine according to FIG. 6.
Figure 16:
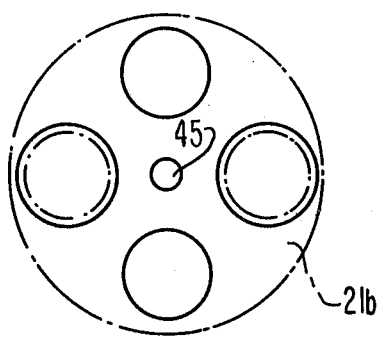
Figure 17:
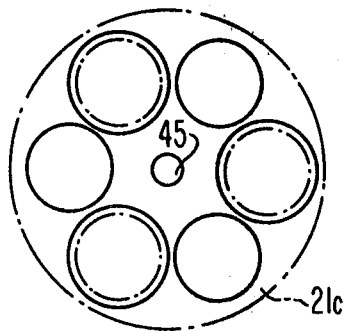
Figure 18:
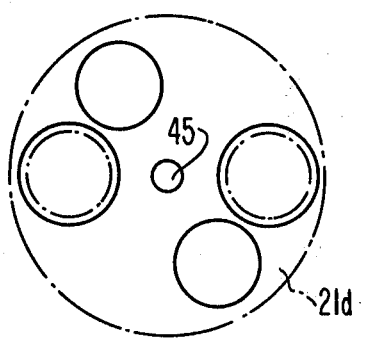
Figure 19:
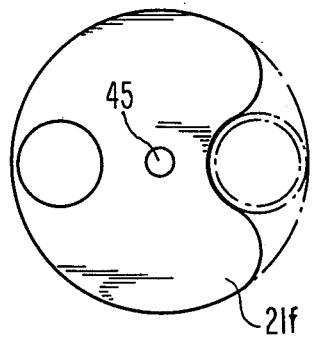
Figure 20:
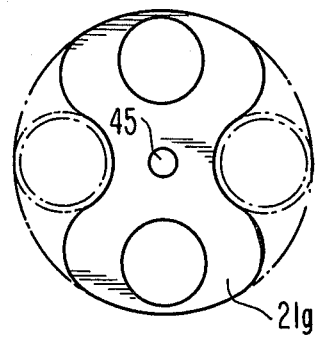
Figure 21:
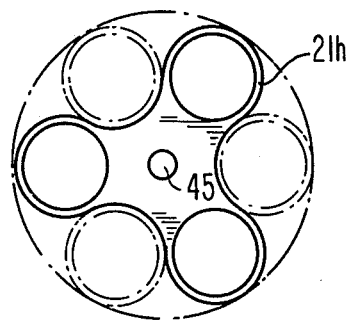
Figure 22:
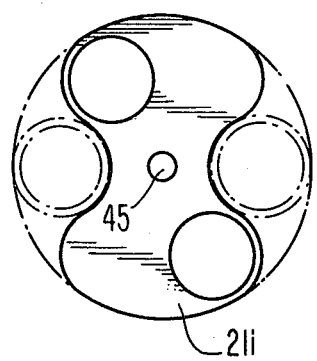

The mode of operation of the apparatus according to FIGS. 6 and 7 will be explained hereinafter with reference to FIGS. 10 and 12. The torque initiation is by a spur wheel 55 which corresponding to the working intervals comprises at its top side holes for the introduction of the plant tubes 11 and for the drill rams 22/16. FIGS. 15 to 18 show different transport 21a, 21b, 21c and 21d which are illustrated in phantom schematically and which provide different interval possibilities of this apparatus. FIGS. 19 through 22 respectively illustrate other integral variation achieving wheels 21f, 21g, 21h and 21i presenting different interval capability.

The transport wheel forms in this case a fixed unit with the drive spur wheel 55 and an upper disc 56 as well as a lower disc 57 each mounted on a plug shaft. When the plant tube enters the interval housing it first reaches the entrance plane 60 of the housing bottom. On rotation of the tube 16 to the planting location 61 the movement is effected via an inclined plane 62 to the exit plane 63, the plant tube thereby passing beneath the rear of the drive spur wheel 55 and being conveyed from there unrestrictedly during the next transport interval along the deflection tongue 48 into the transport channel 65. The latter is mounted on the machine frame. On continuous pressing in of empty tubes the magazine 14 becomes uniformly filled with empties, the empty tubes standing perpendicularly and pushing the magazine forwardly up to a limit switch which stops the machine or supplies a signal when the magazine is to be replaced.

The exit 66 of the transport channel 65 is blocked by a spring clip so that the empty tubes cannot drop out when the magazine is removed. The magazine filled with empty tubes can be closed with a cover and made ready for the next charge.

Above, the machines illustrated in the drawings have been described in their function as planting machines. These planting machines may however also be used to fill the predrilled holes with soil-improving materials, for example with sand, turf and fertilizer mixtures. This does not change their function. The only difference is that in this case magazines are used with tubes which are not filled with plants but with corresponding materials. If a large number of holes are to be filled with soil-improving materials instead of plants, it is advisable to fill the holes with bulk material instead of employing plant tubes. For this purpose, the machine according to FIGS. 1 or 6 can be modified in the manner shown in FIGS. 23 to 27, and the machine may be selectively adapted for planting and for filling holes with bulk material. In its basic construction the machine according to FIGS. 23 to 27 corresponds to the machines according to FIGS. 1 and 6. For this reason, the parts already described with the aid of the latter Figures need not be explained again.

Instead of the press-in ram 16 in the machine according to FIG. 1, according to FIG. 23 at this point a proportioning chamber 146 is provided which is charged from a bulk material box 140 which is mounted on the machine frame 7 via shock-absorbing elements according to FIG. 27. The front wall 141 and the rear wall 142 converge in funnel-like manner in the lower portion and form at their joint a radius which corresponds to the conveying screw 144 disposed with horizontal axis. Said screw serves to press the bulk material 145 disposed in the box 140 into the proportioning chambers 146. The shaft 147 of the screw 144 is mounted on both sides in the box 140 by bearings 148. The necessary torque for returning the screw 144 is provided by the motor 3 via a V-belt 161.

Screw elements are mounted on the shaft 147 of the feed screw 144 in such a manner that in each case adjacent the entrance opening 149 to the proportioning chamber 146 there is a left and right-threaded screw element 150 and 151 respectively. The proportioning chamber 146 has at the top an entrance opening and at the bottom an exit opening 152 which may be opened and closed by separate control valves 153 and 154. The volume of the proportioning chamber 146 corresponds to the volume of the drilled hole 12 which is to be filled. The form of the chamber corresponds to a truncated cone having the greater diameter at the exit opening 152. The conical form of the chamber is intended to prevent sticking of wet material. The control of the valves 153 and 154 and the screw 144 may be either by hand or by programme control. It should be ensured that the entrance opening 149 and exit opening 152 are never simultaneously opened, to prevent the material 145 flowing out.

The distance between the drill axis 20 and the proportioning chamber axis 46 again corresponds to the advance distance a which can be changed by adjusting the setdown points 155 of the box 140. This displacement of the box 140 may be carried out infinitely variably by a guide spindle provided with a hand crank 156. A further possibility is a stepwise adjustment, the box being raised to engage in predetermined detent points. Prior to adjusting the box 140 the connecting element 157 should be loosened.

To avoid bridge formations of the material 145 in the box 140 a vibrator may be disposed on the box outer wall. The highly inclined rear wall 142 then acts as chute so that wet material can also reach the screw 144. The set-down points 155 are provided with oscillating and damping members according to FIG. 27 so that troublesome vibrations are not transmitted to the drilling mechanism or travelling gear.

To clean the drilling field a sweeping machine 158 may follow the filling station. This machine may move the collecting earth into separate containers 160 by means of a sweeping plate 159, a suitably constructed sensor switching the machine off or emitting a signal when the box is full. If the soil remaining on the ground is to be uniformly distributed the container 160 may be removed and the sweeping roller 158 ensures uniform distribution.

FIGS. 28 – 30 illustrate the growth in the plant tubes 11 which are worked with the machines described above.

In special plant tubes 10, for example of plastic material, a soil substrate is introduced which ensures the optimum conditions for the development of the grass plants and guarantees that the plant can fully develop in said tube within 4 to 6 weeks and the roots completely grow through the plant tube and the soil substrate disposed therein.

The plant tubes 11 filled with soil substrate and seed or clones (= plant parts from which new plants develop) are grown in cultivation boxes 14' whose bottom 16' is provided with perforations so that a moisture bridge is established between the soil substrate dispersed in the plant tube and the surface carrying the box 14' through the perforations.

The plant holes are filled in the case of generative reproduction with seed and in the case of vegetative reproduction via clones (= vegetative plant parts) in magazines, with seed or clones being added to part of the plant substrate.

To plant the grown individual plants (FIG. 29) holes adapted exactly in diameter and in depth to the dimensions of the plant tubes must be bored. This can be done completely automatically by the apparatus described with reference to FIGS. 1 to 27. For small areas and for garden operation the semi-automatic apparatus illustrated in FIGS. 31 to 33 may be used.

The drill illustrated in FIG. 31 comprises as drive a conventional mains-operated drill 18' which via a tube extension 20' carries an extended spindle 22' and a mounting 24' attached at the lower end of the tube which carries the extended spindle 22'. The spindle 22' carries a drill chuck 26' into which a special earth borer 28' (FIG. 32) is clamped. The drill unit is supported on the ground via a bottom plate with tube support 30' via spring members 32' which are disposed in star form (FIG. 33).

Due to the pressure exerted on the drill 18' the borer 28' moves through the tube support 30' of the bottom plate into the ground and is limited in its penetration via a pin 34' which is vertically adjustable via a clamping screw and which impinges on the base plate.

We claim:

1. A method for regenerating lawn surfaces comprising the steps of providing a plurality of tubular turf plugs of cylindrical configuration on a wheeled vehicle capable of movement across the lawn surface to be regenerated, causing said vehicle to move forward across said lawn surface for a desired distance, stopping said vehicle, actuating rotary drill means on said vehicle for drilling a first group of holes in the lawn while said vehicle is stopped, causing said vehicle to move forward said desired distance, stopping said vehicle and actuating said rotary drill means on said vehicle to drill a second group of holes in said lawn surface while simultaneously actuating plug inserting means for inserting tubular turf plugs in said first group of holes and completing treatment of the lawn surface by successively repeating the steps of moving the vehicle said desired distance, stopping the vehicle and drilling additional groups of holes while simultaneously actuating the plug inserting means for inserting turf plugs in the group of holes drilled in during the next preceeding drilling operation.

2. The method of claim 1 wherein said rotary drill means is actuated to drill groups of holes in linear alignment in two directions.

3. The method of claim 2 wherein said plug inserting means is actuated to simultaneously insert turf plugs in all holes of the group of holes drilled during the next preceeding stopped movement of said vehicle.

* * * * *